(12) United States Patent
Bell et al.

(10) Patent No.: US 7,677,648 B2
(45) Date of Patent: Mar. 16, 2010

(54) GAS STRUT MOUNTING TO DOOR HANDLE

(75) Inventors: Christopher Dixon Bell, Davenport, IA (US); Kyle Brenner, Silvis, IL (US); Michael David Case, Kechi, KS (US)

(73) Assignee: CNH America LLC, New Holland, PA (US)

( * ) Notice: Subject to any disclaimer, the term of this patent is extended or adjusted under 35 U.S.C. 154(b) by 86 days.

(21) Appl. No.: 12/023,790

(22) Filed: Jan. 31, 2008

(65) Prior Publication Data

US 2009/0195026 A1  Aug. 6, 2009

(51) Int. Cl.
*B62D 33/06* (2006.01)
*B60J 5/04* (2006.01)

(52) U.S. Cl. .................. 296/190.11; 296/1.02
(58) Field of Classification Search .............. 296/146.1, 296/190.11, 1.02, 146.4; 49/339, 340, 356
See application file for complete search history.

(56) References Cited

U.S. PATENT DOCUMENTS

| 1,528,267 | A |  | 5/1925 | Root |  |
|---|---|---|---|---|---|
| 2,282,990 | A |  | 5/1942 | De Paul |  |
| 3,831,699 | A |  | 8/1974 | Wolter |  |
| 4,609,216 | A | * | 9/1986 | Baker et al. | 292/262 |
| 5,067,277 | A |  | 11/1991 | Magalotti |  |
| 5,413,188 | A | * | 5/1995 | Ui | 180/89.12 |
| 6,343,828 | B1 |  | 2/2002 | Young et al. |  |
| 6,811,209 | B2 | * | 11/2004 | Woollett et al. | 296/190.11 |
| 7,281,753 | B2 | * | 10/2007 | Curtis et al. | 296/146.1 |
| 2006/0087150 | A1 | * | 4/2006 | Curtis et al. | 296/146.1 |

FOREIGN PATENT DOCUMENTS

| GB | 2 009 826 A | 6/1979 |
|---|---|---|
| JP | 58-16963 | 1/1983 |
| JP | 2-216373 | 8/1990 |
| JP | 4-110282 | 4/1992 |
| JP | 7-054376 | 2/1995 |

* cited by examiner

*Primary Examiner*—Dennis H Pedder
(74) *Attorney, Agent, or Firm*—Michael G. Harms; John William Stader; Patrick M. Sheldrake

(57) ABSTRACT

A door is provided. The door is pivotably connectable to a cab structure of a work vehicle and includes a handle secured to the door disposed for facilitating door closure against the cab structure from interior of the cab structure. Upon application of a door closure force to the handle, torsion forces applied to the door by the door closure force and a door opening device pivotably connected to the cab structure and to the door in close proximity to the handle, or pivotably connected to the cab structure and to the handle, as calculated at the device pivotable connection opposite the cab structure, are substantially eliminated.

4 Claims, 4 Drawing Sheets

GAS STRUT MOUNTING TO DOOR HANDLE

FIELD OF THE INVENTION

The present invention relates generally to the field of work vehicles having operator cabs. It relates more particularly to work vehicles having operator cabs with doors.

BACKGROUND OF THE INVENTION

Work vehicles, such as skid steer loaders, include a cab structure to protect the operator. A number of cab structures fully enclosure the operator and include an elongated door. To assist the operator with opening the door, a device, such as a gas strut, is secured between the door and the cab structure. To save costs, a single strut is often used, and is either located adjacent to the upper or lower portions of the door to minimally obscure the operator's view. However, door handles are typically positioned on the frame of the door or along a side edge of the door. Door closure achieved by application of door closure forces applied at the door handles creates torsion forces due to the significant misalignment of opposed forces associated with the strut. These torsion forces may damage the door or associated components.

Accordingly, it would be advantageous to significantly reduce or eliminate the torsion forces.

SUMMARY OF THE INVENTION

The present invention relates to a work vehicle including a frame structurally carrying a cab structure and a door pivotably connected to the cab structure. The door includes a first handle and a second handle secured to the door disposed for facilitating door closure against the cab structure from interior of the cab structure. A door opening device is pivotably connected to the cab structure and to the door in close proximity to the first handle, or is pivotably connected to the cab structure and to the first handle. Upon application of a door closure force to the first handle, torsion forces applied to the door by the door closure force and the device, as calculated at the device pivotable connection opposite the cab structure, is reduced when compared to application of a door closure force to the second handle.

The present invention further relates to a work vehicle including a frame structurally carrying a cab structure and a door pivotably connected to the cab structure. The door includes a handle secured to the door disposed for facilitating door closure against the cab structure from interior of the cab structure. A door opening device is pivotably connected to the cab structure and to the door in close proximity to the handle, or pivotably connected to the cab structure and to the handle. Upon application of a door closure force to the handle, torsion forces applied to the door by the door closure force and the device, as calculated at the device pivotable connection opposite the cab structure, are substantially eliminated.

The present invention further relates to a door pivotably connectable to a cab structure of a work vehicle. The door includes a handle secured to the door disposed for facilitating door closure against the cab structure from interior of the cab structure. Upon application of a door closure force to the handle, torsion forces applied to the door by the door closure force and a door opening device pivotably connected to the cab structure and to the door in close proximity to the handle, or pivotably connected to the cab structure and to the handle, as calculated at the device pivotable connection opposite the cab structure, are substantially eliminated.

An advantage of the present invention is a reduction in torsion forces applied to the operator cab door associated with closing the operator cab door of a work vehicle.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
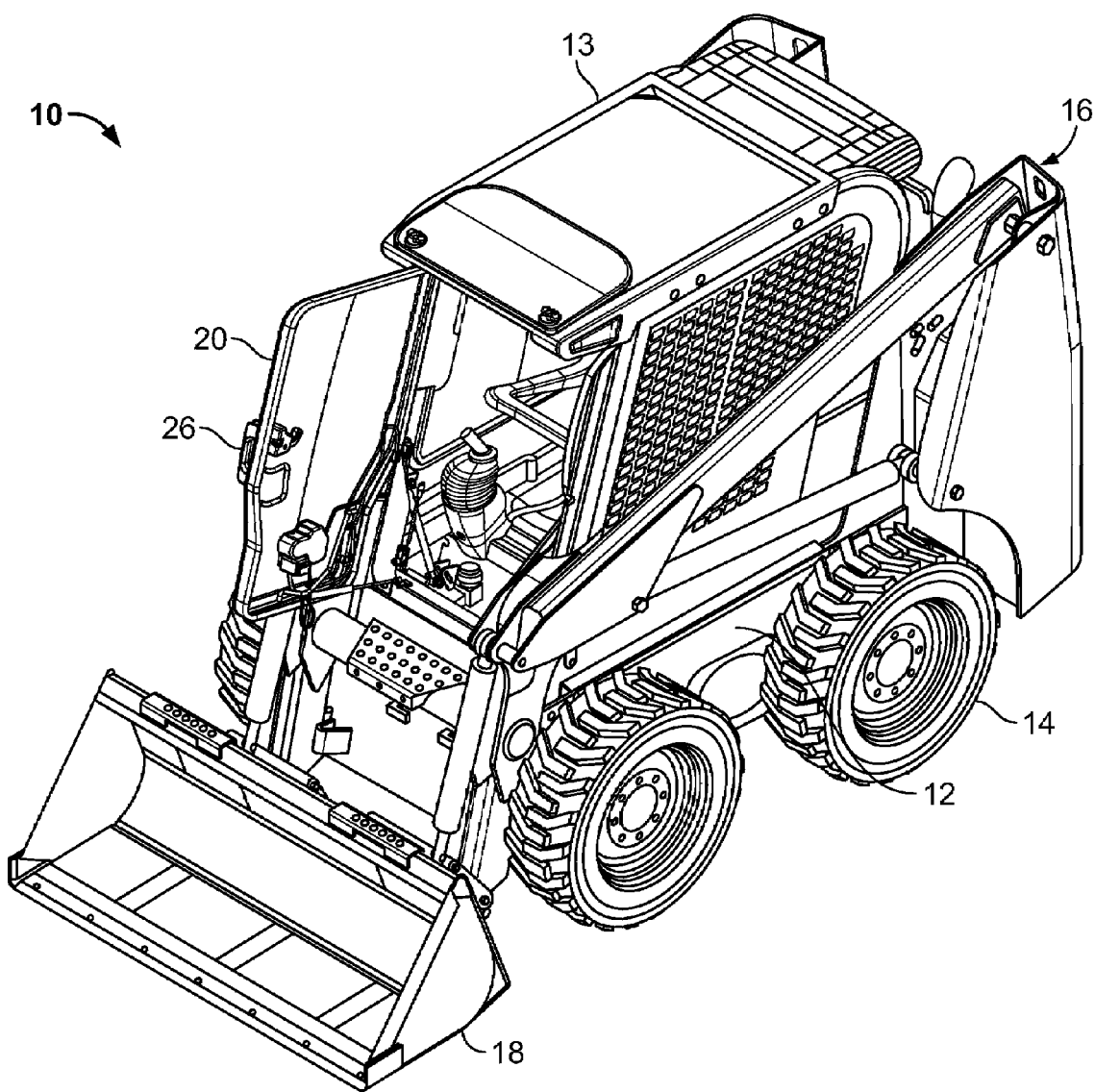
FIG. 1 is a top perspective view of an embodiment of a work vehicle.
Figure 2:
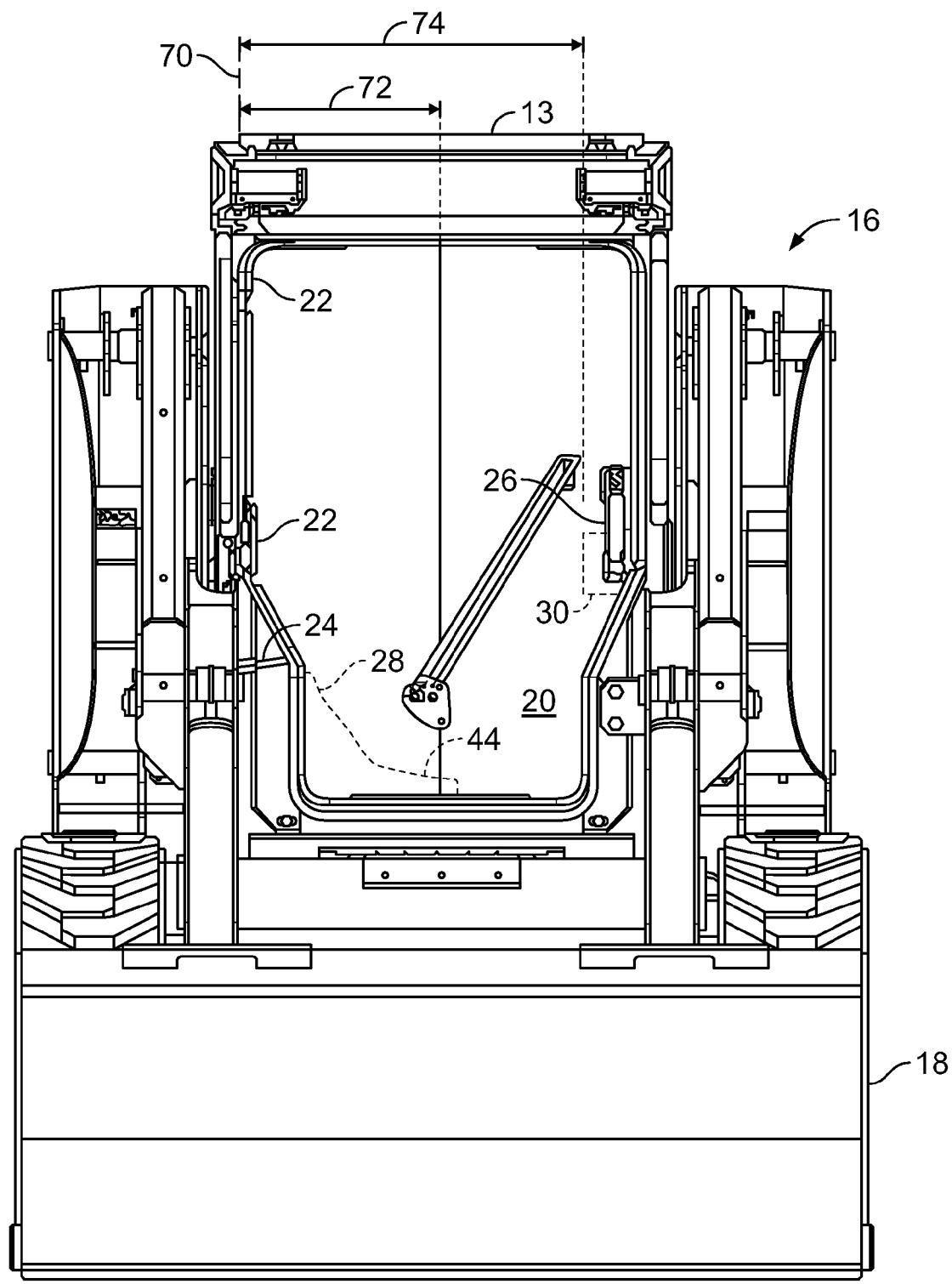
FIG. 2 is a front elevation view of an embodiment of a work vehicle.
Figure 3:
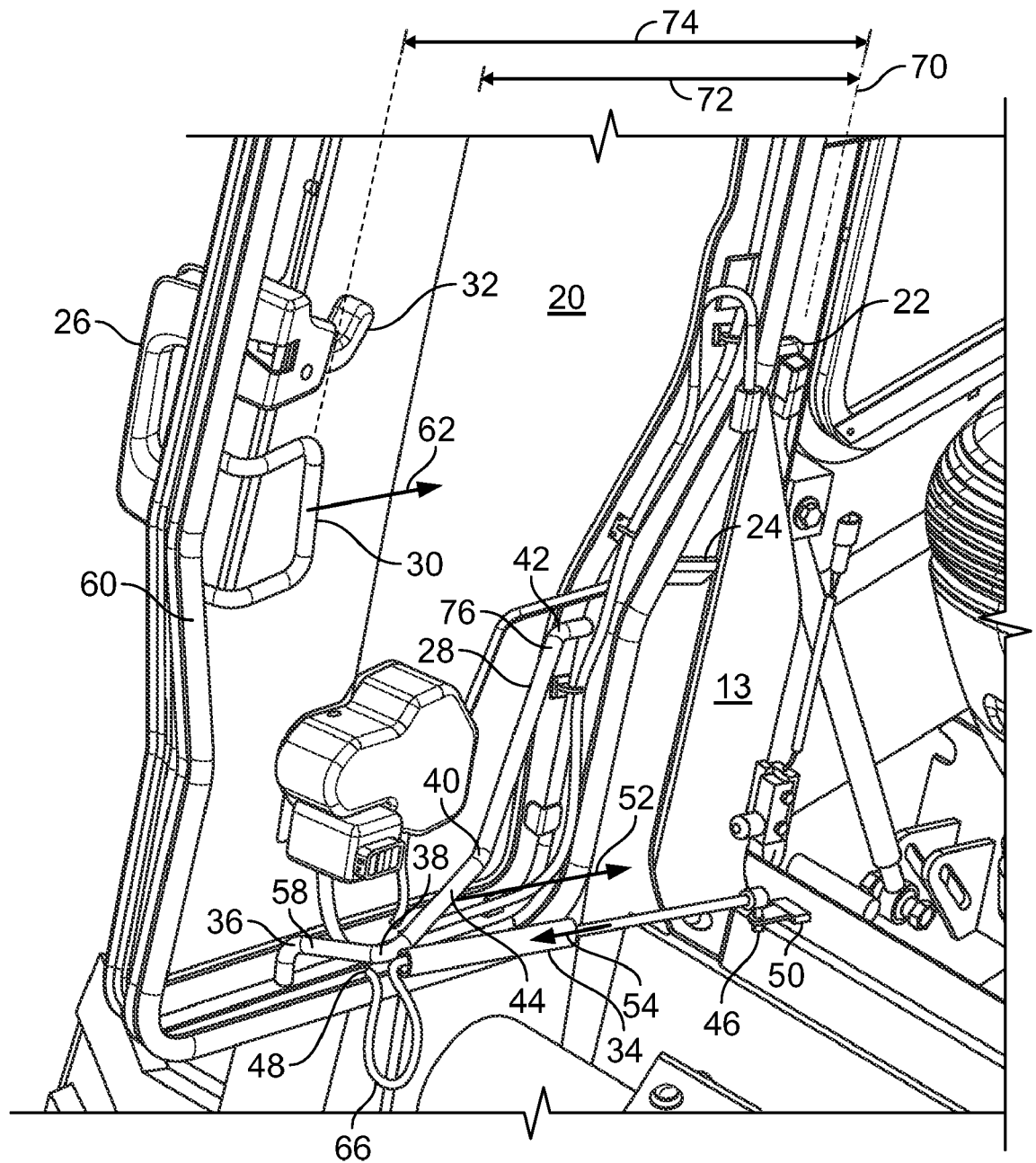
FIG. 3 is an enlarged partial perspective view of a lower portion of a door with the door in an open position.

FIGS. 1 and 2 show a work vehicle 10 provided with a frame 12 that rotatably carries a plurality of wheels 14. A lifting structure 16 includes an arrangement of structural members and actuators controllable by an operator (not shown) to manipulate an implement 18 to perform work. Frame 12 structurally supports a cab structure 13 to surround and protect the operator. A door 20 provides operator ingress/egress to work vehicle 10. As shown in FIG. 2, hinges 22, and optionally hinge 24, permit door 20 to pivot between a closed position (FIG. 2) and an open position (FIG. 3). It is to be understood that the term "open position" is intended to include door positions in which the door is not fully opened.

FIGS. 1-3 show a handle 26 disposed on the exterior surface of door 20 includes a latch (not shown) of known construction to permit access to the interior of cab structure 13. In one embodiment, once door 20 is unlatched, such as by a latch provided with handle 26 or by actuation of latch 32 from interior of cab structure 13, a door opening device 34 having pivoting or pivotable connections between door 20 and cab structure 13 provides a door opening force 54 to help facilitate pivotable movement of the door from the closed position to the open position. As shown in FIG. 3, door opening device 34 includes a pivotable connection 46 with cab structure 13 via a bracket 50 secured to cab structure 13. In an alternate embodiment, pivotable connection 46 may be directly secured to cab structure 13. Opposite pivotable connection 46, opening device 34 includes a pivotable connection 48 with handle 28. In an alternate embodiment, pivotable connection 48 is formed with door 20, e.g., with frame 60, in close proximity to handle 28 (not shown). In another embodiment, door opening device 34 provides a door opening force 54 after door 20 has pivoted a predetermined amount from the closed position. In one embodiment, the predetermined amount of angular movement from the closed position and prior to the application of door opening force 54 is about five degrees, although the amount of angular movement may vary considerably in other embodiments. Door opening device 34 may be a strut, such as a gas strut of known construction, although other constructions, e.g., a hinged torsion spring linkage, compression spring linkage, may also be used.

Figure 4:
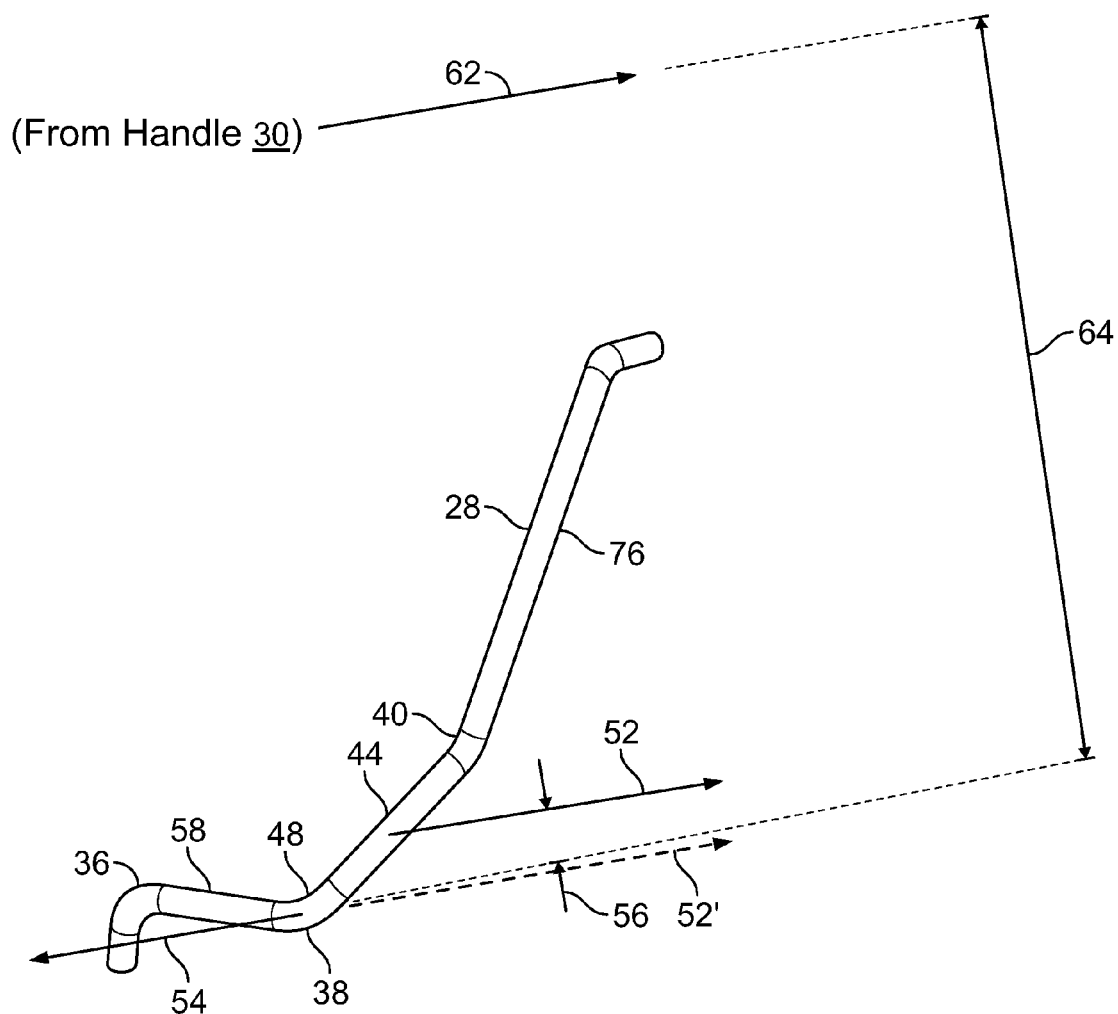
FIG. 4 is a force diagram showing forces associated with closing the door.

Once door 20 is in an open position, in order to close the door from interior of cab structure 13, such as when an operator is located in or entering cab structure 13, an operator may apply a door closure force 52 to a handle 28. Door closure is achieved upon application of sufficient door closure force 52 to overcome door opening force 54 of door opening device 34 and inertia of door 20. As shown in FIG. 4, which is a force diagram of FIG. 3, door opening force 54 is applied at a pivotable connection 48 disposed at or in close proximity to bend 38 of handle 28. Door closure force 52 is shown being applied at the midpoint of a grip portion 44 of handle 28, instead of a plurality of door closure forces applied along the length of grip portion 44 corresponding to the width of the operator's hand grip of the grip portion.

As shown in FIG. 3, handle 28 is a rod that is secured at each end to a frame 60 of door 20, although in another embodiment, handle 28 may be of unitary construction with door 20. In one embodiment, handle 28 is disposed in a lower portion of door 20 to minimally obscure the view of operator through door 20, although handle 28 may also be disposed in an upper portion of door, as well as other portions of the door. However, in each embodiment, door opening device 34 is in close proximity to handle 28. In another embodiment, handle 28 extends along one corner of door 20, such as the lower portion of the door as shown in FIG. 3. In one embodiment, handle 28 includes a plurality of bends 36, 38, 40, 42, although in an alternate embodiment, handle 28 may be substantially linear. As further shown, the portion of handle 28 includes a standoff portion 58 defined between bends 36 and 38. In one embodiment, standoff portion 58 provides sufficient clearance to permit an operator to insert his/her fingers between door 20 and handle 28 to apply a closure force 52. In another embodiment, bends 38 and 40 define grip portion 44. In one embodiment, bends 40, 42 define a transition portion 76 which is directed toward door 20, followed by a bend 42 and the remaining portion of handle 28 that terminates in frame 60. In one embodiment, standoff portion 58 and transition portion 76 are configured so that grip portion 44 is the most ergonomically friendly portion of handle 28 to grasp. In a further embodiment, standoff portion 58 and transition portion 76 are configured so that the portion of grip portion 44 adjacent to bend 38 is the most ergonomically friendly portion of handle 28 to grasp.

Torsion is defined as the state of being twisted or a reactive torque exerted on an elastic solid by reason of being under torsion. Torque, as utilized herein, is defined by the Merriam Webster's Collegiate Dictionary, Tenth Edition, as a measure of the effectiveness of such a force that consists of the product of the force and the perpendicular distance from the line of action of the force to the axis of rotation. Door closure achieved by application of door closure force 62 applied at a door handle 30 (FIG. 3) may create significant torsion forces due to the magnitude of misalignment, or separation, referred to as a moment arm or perpendicular distance 64, between opposed door opening force 54 associated with the door opening device 34 and door closure force 62. These torsion forces, when calculated at pivotable connection 48, which is the product of perpendicular distance 64 and door closure force 62, may be sufficient to damage door 20 or associated components, such as frame 60 and/or hinges 22, 24 (FIG. 2). Such damage is especially a concern when door 20 is elongated, and does not use a frame 60 (FIG. 3) extending other than along the periphery of the door, in order to maximize visibility for the operator.

It will be shown in FIGS. 2 and 3 of the exemplary embodiment that moving the location of the door closure force from handle 30 (door closure force 62) to the midpoint of grip portion 44 of handle 28 (door closure force 52) will significantly reduce the magnitude of torsion forces applied to door 20 associated with the door closure, as calculated at pivotable connection 48. In the exemplary embodiment, this reduction in door closure torsion forces occurs despite the magnitude of door closure force 52 being proportionally greater than door closure force 62, by virtue of the reduction of moment arms or perpendicular distances from axis 70 between perpendicular distance 74 (handle 30) and perpendicular distance 72 (grip portion 44). In other words, the magnitude of torsion forces associated with each of door closure forces 52, 62 as calculated from axis 70 are equal, which torsion forces being the product of the door closure force multiplied by the corresponding perpendicular distance from axis 70 as shown in equation 1:

$$\text{force } 62 \times \text{distance } 74 = \text{force } 52 \times \text{distance } 72 \qquad [1]$$

However, equation [1] is not a measure of torsion forces as calculated at the end of pivotable connection 48 between door 20 and door opening device 34, or the torsion forces reacted by the door itself during door closure. The components of these torsion forces are shown in FIG. 4. That is, pivotable connection 48 is the basis for these torsion force calculations. Torsion forces associated with door closure force 62 (from handle 30) is separated from pivotable connection 48 by moment arm or perpendicular distance 64, the associated torsion forces being the resulting product of perpendicular distance 64 and door closure force 62. In comparison, torsion forces associated with door closure force 52 (from the midpoint of grip portion 44) is separated from pivotable connection 48 by moment arm or perpendicular distance 56, the associated torsion forces being the resulting product of perpendicular distance 56 and door closure force 52. While door closure force 52 is somewhat greater than door closure force 62 in the exemplary embodiment, e.g., less than a magnitude difference of a factor of two, the difference in magnitude between perpendicular distances 64 and 56 is at least 5:1 in one embodiment, about 7.5:1 in another embodiment, and may be more in other embodiments.

In other words, torsion forces applied to door 20 by the door closure force 52 and the door opening device 34, as calculated at the end of pivotable connection 48 between door 20 and door opening device 34, are substantially reduced. In one embodiment, if the operator were to grasp grip portion 44 of handle 28 in close proximity to pivotable connection 48, or bend 38, such as would be the case where the base of an operator's thumb (not shown) is disposed along a standoff portion 58 (FIG. 3) and a number of the operator's fingers engage bend 38, the effective position of door closure force 52 would be much closer to bend 38 and pivotable connection 48, thereby further reducing the magnitude of perpendicular distance 56, and therefore, the torsion forces applied to door 20 by the door closure force 52 at pivotable connection 48. In an alternate embodiment, a strap 66 (FIG. 3), or other door component provided for an operator to grasp as a basis for application of door closure force 52' (FIG. 4), secured in close proximity to or directly to the door opening device 34, such as forming part of pivotable connection 48, would substantially eliminate torsion forces applied to door 20 by the door closure force 52' and the door opening device 34.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A work vehicle comprising:

a frame structurally carrying a cab structure;

a door having a hinged side pivotably connected to the cab structure, the door including a first handle and a second handle secured to the door disposed for facilitating door closure against the cab structure from interior of the cab structure, wherein the first handle is a rod having a first end coupled to a lower portion of the door and a second end coupled to the hanged side of the door, the rod having a plurality of bends disposed between the first and second ends, wherein a first bend is adjacent to the first end, the first bend is bent away from the door towards the interior of the cab and extends into a standoff portion of the handle, the standoff portion is disposed between the first bend and a second bend, the second bend is upwardly bent in a direction away from the first end and also in a direction substantially parallel to the door, the second bend extends into a grip portion, the grip portion is substantially parallel to the door, the grip portion is disposed between the second bend and a third bend, the third bend is upwardly bent in a substantially vertical direction while being substantially parallel to the door, the third bend extends into a upright portion of the handle, the upright portion is substantially parallel to the door and is disposed between the third bend and a fourth bend, the fourth bend is adjacent to the second end of the handle; and a door opening device pivotably connected to the cab structure and to the door in close proximity to the first handle.

2. The work vehicle of claim 1, wherein the device is pivotably connected to ato the door adjacent the grip portion of the first handle and wherein upon application of a door closure force to the grip portion, torsion forces applied to the door by the door closure force and the device are substantially reduced.

3. A work vehicle comprising:

a frame structurally carrying a cab structure;

a door having a hinged side pivotably connected to the cab structure, the door including a handle secured to the door disposed for facilitating door closure against the cab structure from interior of the cab structure, wherein the handle is a rod having a first end coupled to a lower portion of the door and a second end coupled to the hinged side of the door, the rod having a plurality of bends disposed between the first and second ends, wherein a first bend is adjacent to the first end, the first bend is bent away from the door towards the interior of the cab and extends into a standoff portion of the handle, the standoff portion is disposed between the first bend and a second bend, the second bend is upwardly bent in a direction away from the first end and also in a direction substantially parallel to the door, the second bend extends into a grip portion, the grip portion is substantially parallel to the door, the grip portion is disposed between the second bend and a third bend, the third bend is upwardly bent in a substantially vertical direction while being substantially parallel to the door, the third bend extends into a upright portion of the handle, the upright portion is substantially parallel to the door and is disposed between the third bend and a fourth bend, the fourth bend is adjacent to the second end of the handle; and a door opening device pivotably connected to the cab structure and to the door in close proximity to the handle.

4. The work vehicle of claim 3, wherein the device is pivotably connected to the door adjacent the grip portion of the handle.

* * * * *